March 9, 1943.　　　　G. JACK　　　　2,313,705
CHOCOLATE TEMPERING APPARATUS
Filed May 28, 1941　　　4 Sheets-Sheet 2
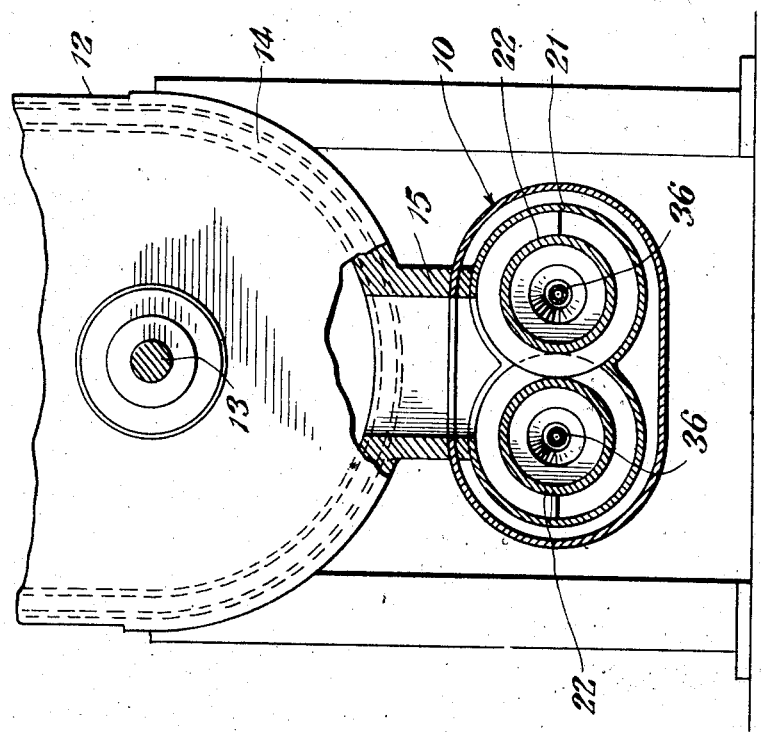
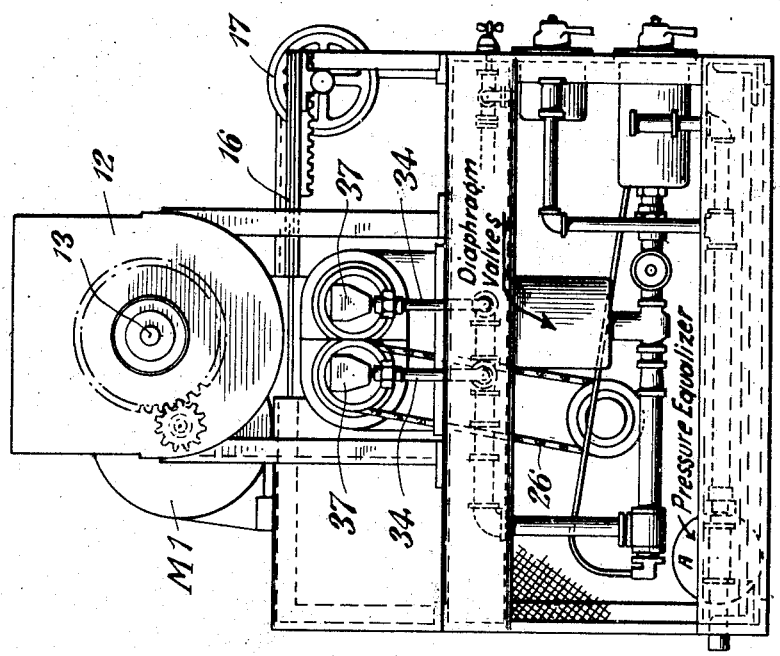
INVENTOR
George Jack
BY
Emery, Varney, Whittemore + Dix
ATTORNEYS

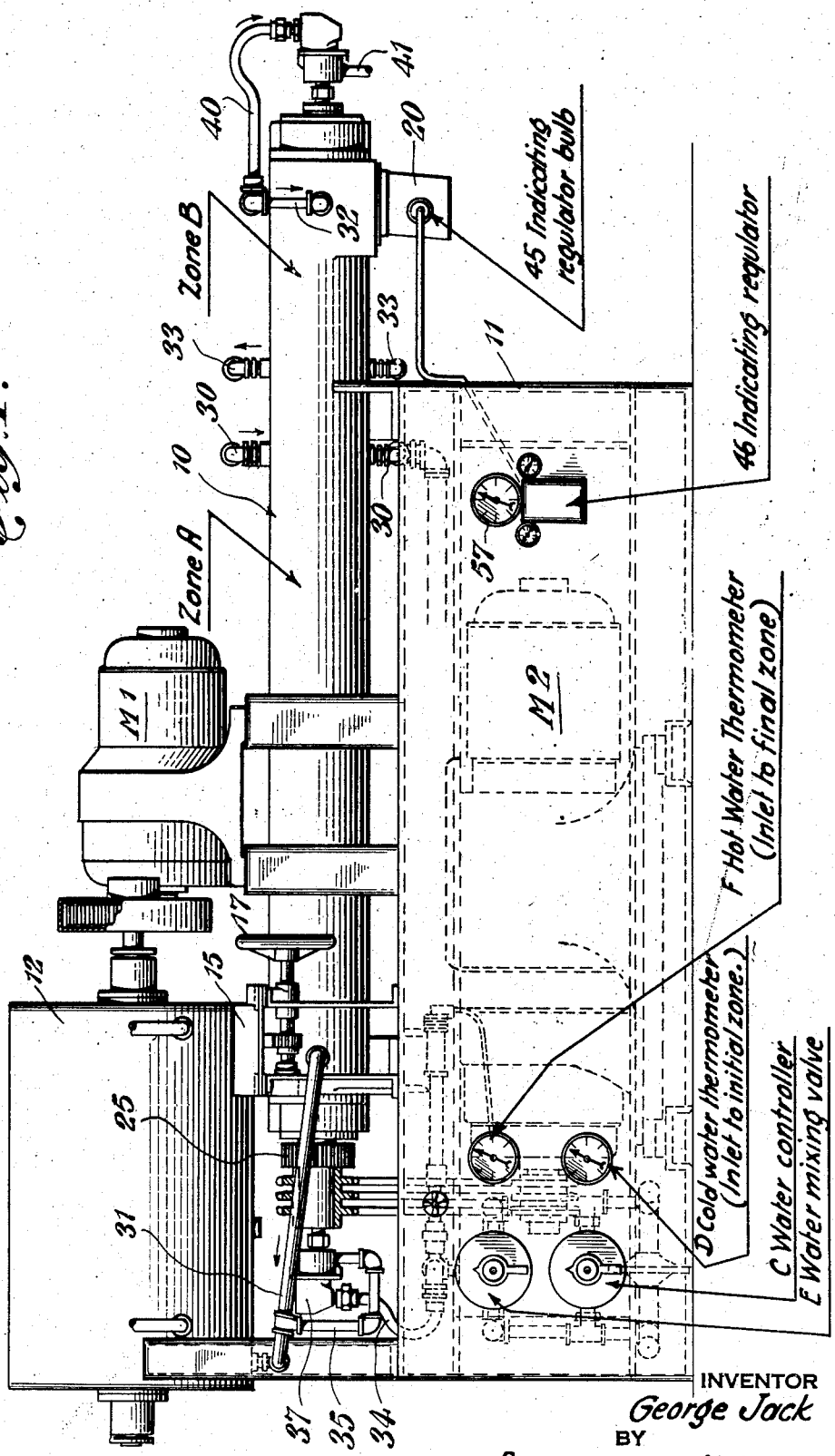

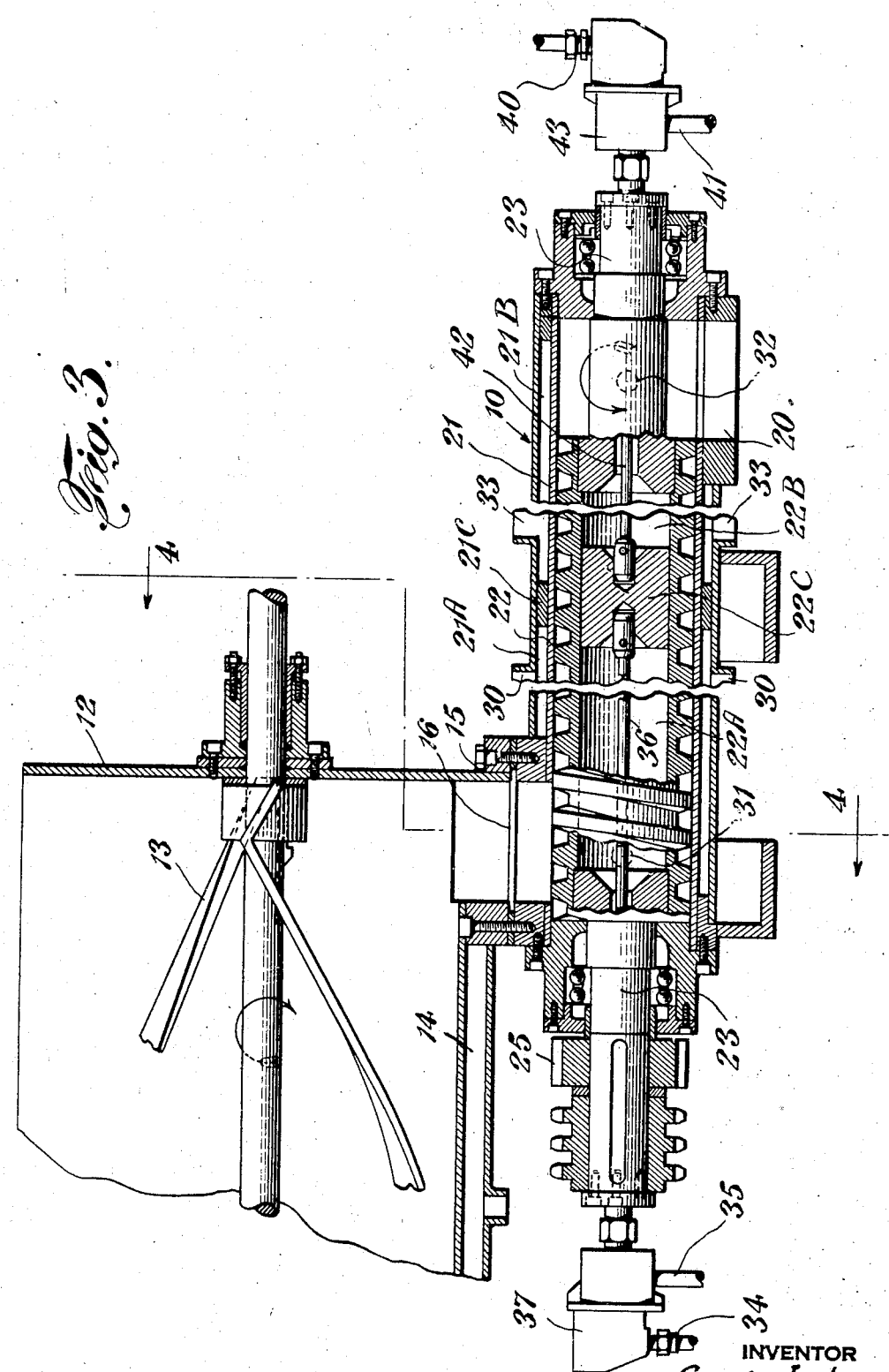

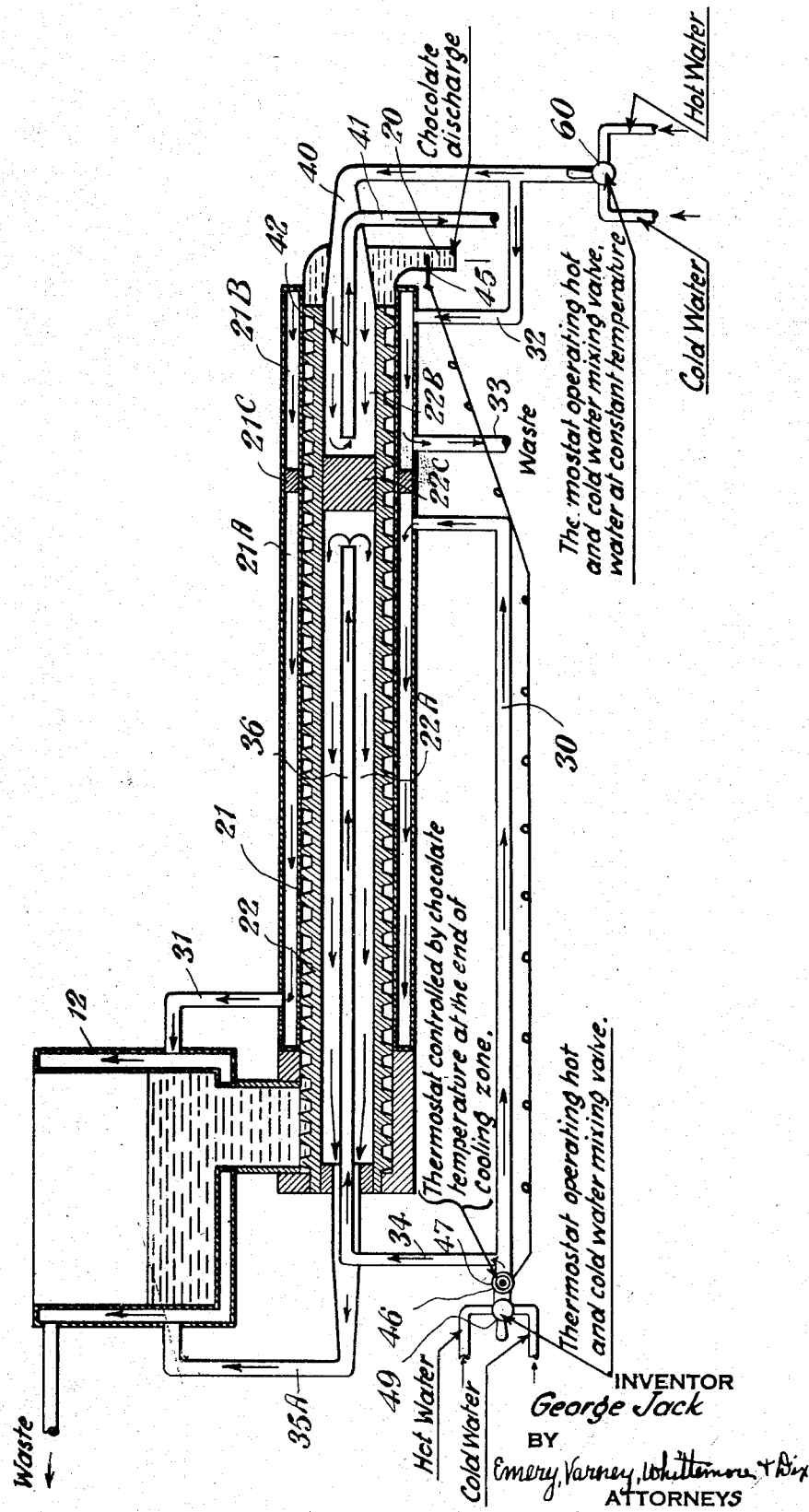

Patented Mar. 9, 1943

2,313,705

UNITED STATES PATENT OFFICE 2,313,705

CHOCOLATE TEMPERING APPARATUS

George Jack, Rochelle Park, N. J., assignor to J. M. Lehmann Company, Inc., New York, N. Y., a corporation of New York Application May 28, 1941, Serial No. 395,632

6 Claims. (Cl. 99—236)

This invention relates to tempering chocolate or the like and has for an object the provision of improvements in this art.

It has long been recognized that when chocolate is used for coating or molding, its temperature must be very accurately controlled, a variation of even one degree or less often causing undesired results.

It has also been known that the desired temperature was only a few degrees above the congealing temperature of the chocolate. The chocolate is usually received at a temperature considerably above its congealing temperature; and since it is desired to reduce its temperature rapidly, the cooling medium must be well below the congealing temperature of the chocolate. This means that the cooling surfaces are well below the congealing temperature of the chocolate. Since chocolate is a poor conductor of heat, the result is that the portions which are directly in contact with the cooling surface tend to congeal at once and cling to the surface.

There have been many plans for overcoming the harmful effects which would result if this surface adhesion were permitted to continue. The principal plan was to scrape the cooling surface continuously to force the most-cooled portions back into the mass.

Now while the desire to keep a small body of chocolate moving along a cooling surface without congealing has been manifest for a very long time, up to the present, so far as is known, there has been no plan which fully satisfied this desire. With the very best equipment available, the actual treatment, if any particular particle of chocolate was followed, has been very uncertain. The particle might or might not be exposed to the cooling surface like certain other particles; it might or might not proceed through the cooling zone like certain other particles—indeed, it might cling to the scraping device for an indefinite period without any forward movement and without any change in temperature.

According to the present invention, the material is forced to travel forward in increments in a positive manner. And not only is the fixed cooling casing kept scraped clean of material at all times, but the scraping means itself is continuously scraped clean. In this movement the material is constantly mixed thoroughly and no part is permitted to segregate or stagnate.

Having provided for a positive movement by increments and thorough mixing, the invention provides further improvements in the method of effecting the tempering action and in the control of this action.

The apparatus is very small for its large capacity and is largely self-cleaning. It may be run at various speeds with equal effectiveness, thus permitting it to be properly coordinated with the equipment or process with which it is used.

The objects and advantages of the invention will appear from a consideration of one embodiment of the invention which is illustrated in the accompanying drawings, wherein:

Fig. 1 is a side elevation of apparatus embodying the invention;

Fig. 2 is an end elevation;

Fig. 3 is a vertical longitudinal section;

Fig. 4 is a vertical transverse section taken on the line 4—4 of Fig. 3; and

Fig. 5 is a diagrammatic view to illustrate the flow of material and heat exchange fluid.

Referring to the drawings, the tempering machine 10 is supported upon a base 11 which houses certain drive and control mechanism. Material is supplied from a hopper 12 which may incorporate a mixer agitator 13, the shaft of which is driven by a motor M1. The mixer agitator may be of the double spiral type to keep the material thoroughly agitated by cross currents without any pronounced directional movement. The mixer casing or hopper is jacketed to provide a space 14 for the flow of heat exchange fluid.

Material from the hopper or mixer flows downward through a feed tube 15 into one end of the tempering machine, valve means of any suitable type being employed to control the rate of feed. As shown, a slidable plate valve 16 controlled by the hand wheel 17 is used.

Tempered material at a very closely regulated temperature is discharged at the other end of the tempering machine through the spout 20. It may proceed to coating or molding apparatus or any other desired point of use, and some of the material may be returned to the mixer. This may be readily understood without illustration.

The tempering machine proper comprises a casing 21 provided with two connecting cylindrical bores, in which operate two meshing spiral gear rotors 22. As shown in Fig. 4, these rotors completely fill the tubular space and provide a very close seal with the casing and with each other to form a plurality of closed pockets between their teeth which move successive increments of the material along positively while keeping it in continual agitation. A single spiral gear rotor or even a dual spiral gear rotor without a tight casing could not produce this action. There inertia, friction, gravity or other forces are depended upon to cause the material to flow, and it is impossible to prevent adhesion of some of the material to the rotor; whereas here these factors are not depended upon.

The rotor shafts 23 are journaled in fluid tight bearings in the end walls of the casing. They are connected by gears 25 and one of them is driven by a motor M2 through any suitable transmission, as by a plurality of belts or chains 26. The speed is variable over a suitable range.

The casing 21 is jacketed to provide a space 21A for heat exchange fluid, and there may be an additional space 21B which is separated from the first by a partition 21C. The first portion over the length of the space 21A may be referred to as the first or initial heat exchange zone, and the second portion over the length 21B may be referred to as the final or finishing heat exchange zone. It is to be understood that the final zone may be employed solely for preserving the temperature attained in the first zone and that there may not be an actual exchange of heat in the finishing zone. The machine is very carefully finished with tolerances in the thousandths of an inch, so that there is a perfect working fit but no rubbing friction between mechanical parts to generate heat. Consequently the normal radiation losses in the finishing zone may about counteract the heat generated in the agitation of the material in the convolutions of the rotors.

Similarly the rotors 22 are provided with spaces 22A and 22B for heat exchange fluid in the initial and final zones, respectively, a partition 22C serving to separate the spaces.

In Fig. 5 the flow of fluid is shown diagrammatically. Here the cold cooling fluid, usually water, flows in at the right or exit ends of the zones (reference being to chocolate flow) and flows out at the left or entering ends. The cooling fluid which leaves either or both zones will normally be near or above the congealing temperature of the chocolate. It may for economy be used to initiate the cooling of the chocolate in the hopper or mixer without danger of congealing it at a place where it will not be constantly positively forced along. As shown, the cooling fluid from the initial zone only is used for the mixer. The mixer blades scrape the sides and ends of the mixing vessel to keep all material mixed into the mass.

A pipe 30 supplies fluid to the initial zone of the casing and a pipe 31 withdraws it therefrom and conducts it to the mixer casing. A pipe 32 supplies fluid to the finishing zone of the casing and a pipe 33 conducts it therefrom.

Pipes 34 supply fluid to the initial zone of the rotors and pipes 35 withdraw it therefrom and conduct it to the mixer casing. Concentric pipes 36 in the rotors conduct the fluid to the exit end (with reference to chocolate flow) before discharging it into the rotors. The fluid enters and leaves by rotary seal fittings 37 on the rotor shafts.

Pipes 40 supply fluid to the finishing zone of the rotors and pipes 41 withdraw it therefrom. Pipes 42 conduct the fluid out of the rotors. The fluid enters and leaves by rotary seal fittings 43 on the rotor shafts.

Means are provided for controlling the temperature of the cooling fluid in accordance with the temperature of the chocolate, in order to control the final temperature of the chocolate within very narrow limits. The means illustrated comprise a temperature responsive element or bulb 45 placed in the outlet 20 where it is bathed in the tempered chocolate. This element 45 is connected to a control device 46 which regulates the volume of flow of cooling fluid to the initial zone of the casing and rotors by a pneumatic valve 47. A hand set temperature mixing control 49 for hot and cold water regulates the temperature of the water supplied. Gauges are provided for indicating the temperatures of the hot and cold water and of the mixed water. The pneumatic supply pressure and the valve supply pressure at the control device 46 are indicated by suitable gauges.

A temperature gauge 57 is provided for indicating the temperature of the chocolate at the spout 20.

The temperature of the water supplied to the finishing zone of the casing and rotor may be controlled by a hand set temperature responsive mixing device 60 which operates to control the relative flow in the hot and cold water supply pipes in accordance with the temperature of the mixed water. A hand control is provided for setting the volume of flow. In Figs. 1 and 2, A indicates a pressure equalizer, B indicates diaphragm pneumatic operated water flow control valves, C indicates a water controller, D indicates a thermometer for supply water to the initial zone, E indicates a water mixing valve, and F indicates a thermometer for supply water to the final zone.

By way of illustration, the chocolate may be delivered to the mixer at say 110-140° F. In the mixer its temperature may be lowered to reduce the work required of the tempering machine and increase its capacity. The chocolate may thus be supplied to the tempering machine at approximately a given temperature. The mixed cooling water may be supplied to the initial zone at say 50-70° F. This is considerably below the congealing temperature of the chocolate (about 86-90° F., depending on its type), but no congealing occurs because all of the chocolate is constantly being removed from the cooling surfaces and kept in agitation as it is positively moved along in increments in the grooves of the spiral gears.

The chocolate delivered to the final zone may be slightly below or slightly above or substantially the same as the final desired delivery temperature. It is easier to heat chocolate than to cool it evenly, and for this reason and for some purposes it is preferred to have a heating rather than a cooling or temperature holding action in the final zone. Therefore, the temperature of the water supplied to the final zone may be slightly below or slightly above or approximately the same as the delivery temperature of the chocolate. Suitable control may be effected by providing only a single heat exchange zone; but where a plurality of heat exchange zones are employed, the first will have a wider differential between temperatures of the heat exchange fluid and the chocolate than the subsequent zone or zones. The final zone will have the smallest differential and here the heat exchange fluid may be kept above the congealing temperature of the chocolate.

By using a plurality of meshing spiral gear rotors which keep the material in constant positive movement and agitation, it is made practicable to cool both rotor and stator, and this practically doubles the capacity. It is not practicable to cool the rotor of any known type of single screw tempering machine, but only the casing, because no means of scraping material could be provided, and if the chocolate congealed on the rotor (as it would to some extent in any event) it would merely rotate with the rotor without moving forward. It is thus seen that the twin rotor machine will produce at least four times as much as a single rotor machine of comparable rotor dimensions, even if the positive movement of material peculiar to the twin rotor machine were disregarded. Bpt the positive movement is a very appreciable factor in speed of treatment; and moreover the continuous agitation and uniform treatment of all particles produces a superior product because there is no opportunity for portions to congeal and form lumps. These lumps, if formed, do not work out before the chocolate is used. The product produced by the present machine is very smooth and fluid even when delivered at a temperature nearer the congealing temperature than for many other machines.

The teeth of the rotors are relatively short so that the bands of material in the grooves therebetween are relatively thin. This promotes rapid heat exchange from the inner and outer surfaces. As an example, but without intention to limit the range, the grooves may be about ¾" deep and ¾" average width. The teeth have inclined sides to fit closely together without wedging to cause mechanical friction.

Something of the action produced by the gears may be noted. The meshing teeth divide the grooves of each rotor into confined spaces of one turn length. In these spaces the chocolate is in constant agitation, caused, on the one hand, by the rolling together of the gears at the point of meshing, and, on the other hand, by the continuous scraping of material from the stator casing walls by the spiral gear teeth. The first action is a circumferential cross flow and the second is a vortical action in co-axial planes. In the first action, material on the inside tends to flow in the direction of rotation of each rotor because of friction and tendency to congeal, and on the outside next the stator casing it tends to flow in the opposite direction. In the second action, material on the outside tends to flow forward in the direction of total movement from feed to discharge, and on the inside next the rotor teeth it tends to flow in the opposite direction. The resultant of these actions, as may be realized, will cause many cross currents and complete agitation and mixing of the material as it moves forward.

Either the speed of rotation or the amount of material fed or the temperature or volume of the heat exchange fluid may be varied at will, and this provides great latitude and complete control of operations. Once an adjustment is made, it will be precisely maintained by the automatic controls.

One embodiment of the invention has been described but it is to be understood that there may be various other embodiments within the limits of the prior art and the scope of the subjoined claims.

I claim as my invention:

1. Apparatus for tempering chocolate, comprising in combination, a casing having connecting bores and end walls forming a plural-cylinder chamber, a plurality of spiral worm rotors fitting very closely in sealing relationship with but not in contact with the inner walls and ends of said casing to continuously scrape substantially all material therefrom, said rotors also having a very close but non-contacting sealing fit with each other at their meshing line to keep material in each convolution separate from that in each other convolution and positively move the material along while circulating it in the rotor grooves, said casing being jacketed over substantially its entire circumference and said rotors being cored for heat exchange fluid, means for circulating heat exchange fluid in the casing and rotors, and means for feeding fluent material laterally into the intake space between said rotors at one end.

2. Apparatus for tempering chocolate, comprising in combination, a plural-bore casing provided with a complete surrounding jacket with end walls divided into a plurality of separate zones along its length, a plurality of cored spiral geared rotors fitting closely in sealing relationship with and within said casing on the sides and ends and with each other, said rotor core spaces being divided into a like plurality of co-extensive zones along their length, means for separately circulating heat exchange fluid in each casing and rotor space, and means for feeding fluent material laterally into the intake space between said rotors at one end.

3. Apparatus for tempering chocolate, comprising in combination, a plural-bore casing provided with a substantially complete surrounding jacket with end walls divided into a plurality of separate zones along its length, a plurality of cored spiral geared rotors fitting closely in sealing relationship with and within said casing on the sides and ends and with each other, said rotor core spaces being divided into a like plurality of co-extensive zones along their length, means for separately circulating heat exchange fluid in each casing and rotor space, the fluid for all spaces of each zone being furnished from a common source and moving in the same axial direction in the casing and rotor spaces so that the casing and rotor temperatures in any cross section are approximately the same, and means for feeding fluent material laterally into the intake space between said rotors at one end.

4. Apparatus for tempering chocolate, comprising in combination, a plural-bore casing provided with a substantially complete surrounding jacket with end walls divided into a plurality of separate zones along its length, a plurality of cored spiral geared rotors fitting closely in sealing relationship with and within said casing on the sides and ends and with each other, said rotor core spaces being divided into a like plurality of co-extensive zones along their length, means for separately circulating heat exchange fluid in each casing and rotor space, means including a temperature controlled mixing device and feed controls for fluids at different temperatures for maintaining a constant temperature of fluid supplied to the initial zone, means for feeding fluent material laterally into the intake space between said rotors at one end, means responsive to the final discharge temperature of the chocolate for controlling the volume of fluid flow in the initial zone, means including a temperature controlled mixing device and feed controls for fluids at different temperatures for maintaining a constant temperature of fluid supplied to the final zone, and hand-operated means for controlling the volume of fluid flow in the final zone.

5. Apparatus for tempering chocolate, comprising in combination, a plural-bore casing provided with a substantially complete surrounding jacket with end walls divided into a plurality of separate zones along its length, a plurality of cored spiral geared rotors fitting closely in sealing relationship with and within said casing on the sides and ends and with each other, the rotor core spaces being divided into a like plurality of co-extensive zones along their length, means for separately circulating heat exchange fluid in each casing and rotor space, means including a temperature controlled mixing device and feed controls for fluids at different temperatures for maintaining a constant predetermined temperature of fluid supplied to the initial zone, means for feeding fluent material laterally into the intake space between said rotors at one end, means responsive to the final discharge temperature of the chocolate for controlling the volume of fluid flow in the initial zone, means including a temperature controlled mixing device and feed controls for fluids at different temperatures for maintaining a constant temperature of fluid supplied to the final zone, and hand-operated means for controlling the volume of fluid flow in the final zone, the fluid for all spaces of each zone being furnished from a common source and moving in the same axial direction in the casing and rotor spaces so that the casing and rotor temperatures in any cross section are approximately the same.

6. Apparatus for tempering chocolate comprising in combination, a jacketed mixer, a jacketed tempering machine casing divided into initial and final heat exchange zones, twin spiral geared cored rotors fitting closely in said casing at the sides and ends and with each other to form a plurality of confined sealed spaces for progressively moving thin bands of material of definite length from the inlet end to the outlet end while keeping the material in agitation and constantly cleaned from the casing and rotors, means for feeding fluent material laterally into the intake space between said rotors at one end, said cored rotors being divided into corresponding co-extensive initial and final heat exchange zones, means for supplying cooling fluid to the initial zone of the casing and rotors, means for passing the used cooling fluid from the initial zone to the mixer jacket, means for supplying heat exchange fluid to the final zone of the casing and rotors, and means for controlling the temperature of the initial zone in accordance with the temperature of chocolate discharged from the final zone.

GEORGE JACK.